United States Patent [19]

Seidensticker, Jr. et al.

[11] Patent Number: 6,128,012

[45] Date of Patent: *Oct. 3, 2000

[54] USER INTERFACE FOR A PORTABLE DATA MANAGEMENT DEVICE WITH LIMITED SIZE AND PROCESSING CAPABILITY

[75] Inventors: Robert B. Seidensticker, Jr., Woodinville; Vinay Deo, Bellevue; Michael John O'Leary, Redmond, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/826,542

[22] Filed: Apr. 3, 1997

Related U.S. Application Data

[60] Provisional application No. 60/025,748, Sep. 19, 1996.

[51] Int. Cl.[7] .................................................. G06F 3/14
[52] U.S. Cl. .............................................. 345/336; 345/341
[58] Field of Search .................................. 345/326–358, 345/123–125, 963, 973, 169

[56] References Cited

U.S. PATENT DOCUMENTS

| | | | |
|---|---|---|---|
| 4,862,390 | 8/1989 | Weiner | 345/352 |
| 5,295,241 | 3/1994 | Eagen et al. | 345/341 X |
| 5,317,306 | 5/1994 | Abraham et al. | 345/124 X |
| 5,384,579 | 1/1995 | Nakasuji et al. | 345/123 |
| 5,485,175 | 1/1996 | Suzuki | 345/353 |
| 5,495,566 | 2/1996 | Kwatinetz | 345/341 |
| 5,510,811 | 4/1996 | Tobey et al. | 345/341 |
| 5,563,631 | 10/1996 | Masunaga | 345/169 |
| 5,568,603 | 10/1996 | Chen et al. | 345/341 |
| 5,655,094 | 8/1997 | Cline et al. | 345/341 |
| 5,673,401 | 9/1997 | Volk et al. | 345/327 |
| 5,677,708 | 10/1997 | Matthews, III et al. | 345/123 X |
| 5,689,668 | 11/1997 | Beaudet et al. | 345/353 |
| 5,689,669 | 11/1997 | Lynch et al. | 345/341 X |
| 5,758,295 | 5/1998 | Ahlberg et al. | 345/353 X |
| 5,760,776 | 6/1998 | McGurrin et al. | 345/353 |
| 5,790,115 | 8/1998 | Pleyer et al. | 345/341 X |
| 5,812,117 | 9/1998 | Moon | 345/169 |
| 5,815,142 | 9/1998 | Allard et al. | 345/169 X |

OTHER PUBLICATIONS

Advanced Interface Design Guide, IBM Corp., 59–61, 63–72, Jun. 1989.
Cowart, "Mastering Windows 3.1", Sybex, Inc., pp. 18–20, 28–29, 266–267, 414–417, 836–838, 1993.
Microsoft Schedule + v7.0a, Microsoft Corp., screen dump pp. 1–13, 1996.
Cowart, "Mastering Windows 3.1", Sybex, pp. 268–269, 1993.

*Primary Examiner*—Steven Sax
*Attorney, Agent, or Firm*—Ronald M. Anderson

[57] ABSTRACT

A user interface for a combination pager and personal information management (PIM) data device provides considerable versatility in accessing the data and in controlling how the data are displayed to the user. The user interface includes a display screen having only a few rows oil which lines of data are displayed, and four control buttons, including an Up button, a Down button, an Action button, and a Back button. Since the device maintains data in a hierarchical directory structure and starts at the highest (root) level, the Action button is used to move to a lower level in the directory hierarchy, while the Back button is used to move back up to a higher level. In addition, the Action button is employed to initiate a selected function. If a line (or entry) of a list is above the top line displayed on the screen, an upwardly pointing arrowhead is displayed to the user adjacent the top line. Similarly, a downwardly pointing arrowhead is displayed if a line in the list is below the last line on the screen currently displayed. The user can select an application to execute in the root node of the hierarchy when the device is initially turned on, reset, or after a predefined time interval has elapsed. In addition, the user can selectively actuate a faster scroll rate to move up or down through a list that is relatively long. The format applied to data presented to the user in the display screen is user selectable.

28 Claims, 8 Drawing Sheets

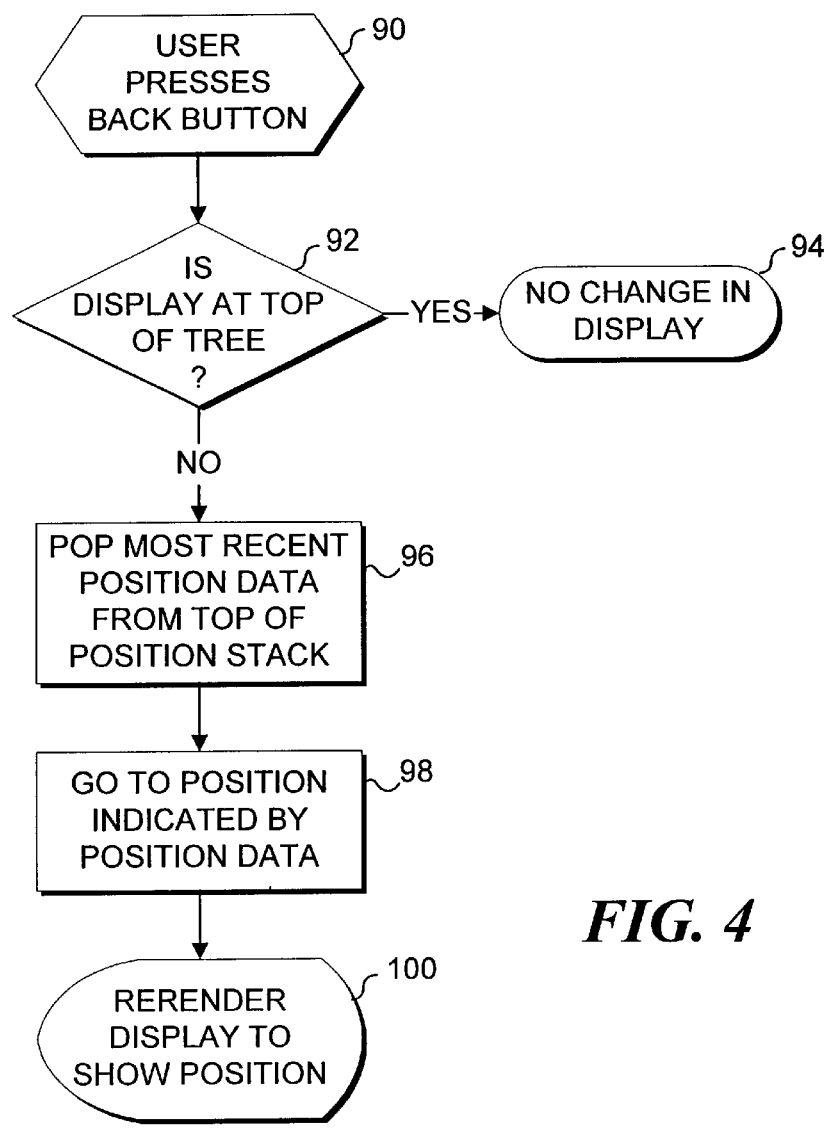
FIG. 4
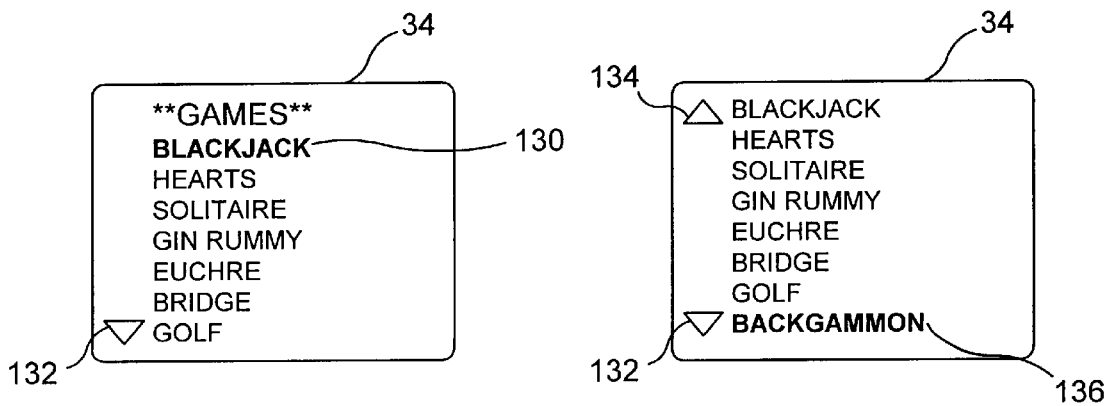
FIG. 6A   FIG. 6B

USER INTERFACE FOR A PORTABLE DATA MANAGEMENT DEVICE WITH LIMITED SIZE AND PROCESSING CAPABILITY

RELATED APPLICATION

This application is a continuation-in-part of prior copending provisional Application Ser. No. 60/025,748, filed Sep. 19, 1996 pending, priority in the filing date of which is hereby claimed under 35 United States Code Section 119(e).

FIELD OF THE INVENTION

The present invention is generally directed to a user interface for a device that stores and displays data, and more specifically, to a device having a processor that manages data presentation and access in which the user interface enables control, selection, and viewing of data items and options displayed on a screen.

BACKGROUND OF THE INVENTION

Personal information managers (PIMs) are tools that greatly enhance access to information required in various social and business activities. The information may include lists of important telephone numbers, scheduled events or meetings, addresses, important dates, things to be done, items to be purchased—in short, almost any type of data that might be needed by a person. To facilitate entry and storage of data into devices such as personal digital assistants (PDAs), they are generally made sufficiently large to incorporate a QWERTY keypad. However, if a full keypad is included within a PIM device, the resulting package tends to be too large to be conveniently carried on one's person rather than being hand carried. Clearly, a smaller package and a different approach for entering the data are required if the device is to be small enough that it does not have to be carried by hand and is to be readily accessible at all times. Any device that cannot easily be carried within a pocket or attached to a person's body or clothing is likely to be left behind and will thus be unavailable when needed.

One solution to this problem that has already been developed is the Timex Data Link Watch™ wristwatch. This watch includes a microprocessor and non-volatile memory used to store data that can subsequently be recalled to appear on a liquid crystal display (LCD) screen on the watch. Data that are used by the watch are initially entered on a personal computer, for example, using Microsoft Corporation's Schedule+™ or Lotus' Organizer™ personal scheduling software. To store selected data within the non-volatile memory of the watch, a data link feature is executed in the software running on the personal computer that causes display lines on the computer screen to flash in a manner that encodes the selected data. A light sensor on the watch detects the flashing lines on the computer screen, and the data encoded and conveyed thereby are decoded by a processor in the watch and stored in the memory of the watch for subsequent recall by the user.

While a wristwatch that stores data for access by a user is a significant step forward in making the PIM data available whenever required, it has several limitations. The LCD of the watch is relatively small, enabling only a few characters of text to be displayed. Further, the memory of the watch is very limited. Editing of the data stored in the watch is impractical, since there is no keyboard or other facility to enter alphanumeric characters. Unless the watch is brought back to the personal computer to download new data, the information stored in the memory of the watch cannot easily be changed.

A different type of data management system is required that is sufficiently small to be readily transportable like the Data Link Watch™, but is capable of displaying more data and includes additional functions that are not practical in the Data Link Watch™ PIM device. For example, it would be desirable to be able to execute simple software routines on the device and to make minor editing changes in the personal information data that are stored within the device. To accomplish these objects, the device preferably should include a user interface that displays the personal information data, menus, lists, and other data in a hierarchical structure to enable the user to quickly access the specific data or functions desired. To keep the device relatively small, the controls provided should be limited in size and number, for example, from four to six buttons. Further, the user should have the options for displaying the personal information data available in several different formats. The user should be able to at least scroll through lines on the display line-by-line to reach a desired data item. However, since too much time is required to scroll through long lists of data in this manner, the device should also enable the user to selectively move through the data at a substantially faster rate. No prior art portable PIM device that can be carried on a person is known that offers these features.

SUMMARY OF THE INVENTION

In accordance with the present invention, a portable device is defined for storing and managing data accessed by a user. The device includes a memory for storing a plurality of machine instructions and for storing the data accessed by the user. Also included is a display on which a plurality of lines of data are presented to the user. The display is able to present only a predefined maximum number of lines, m, to the user at one time so that a list of n lines (where n can be greater than m) is presented to the user by scrolling through the list. A plurality of controls selectively enable the user to control and manipulate the data presented in the lines on the display in a manner that is a function of the type of data being accessed. Furthermore, a processor, which is electrically coupled to the memory, the display, and the plurality of controls, implements a plurality of functions when executing the machine instructions. Among these functions is the provision for including a first character on the display disposed adjacent to the first line of the display to indicate that a top line of the list has been scrolled off of the display when the top line of the list is no longer visible. Similarly, a second character is included on the display adjacent to the bottom line of the display to indicate that a bottom line of the list is not currently visible on the display, when a different line from the list that is above the bottom line is currently being displayed. In the preferred form of the invention, the first character comprises a first graphic icon (e.g., an upwardly pointing arrow) and the second character comprises a second graphic icon (e.g., a downwardly pointing arrow).

Generally, the data that are presented to the user in the display comprise a hierarchical directory having a plurality of levels. The plurality of controls in one preferred form of the invention include a first pair and a second pair of controls (e.g., buttons), and the two controls comprising each pair perform generally inverse actions relative to each other. Specifically, the first pair of controls consist of an Action control and a Back control. The Action control causes the processor to implement a function indicated by a line of text on the display that is currently selected. In addition, the Action control causes the display to present a next lower level of the hierarchical directory, and the Back control causes the display to present a next higher level of the hierarchical directory (if available). The second pair of controls includes an Up control and a Down control. The Up control generally causes the processor to select a line on the display that is above a currently selected line, and the Down control conversely causes the processor to select a line that is below a currently selected line.

A root level of the hierarchical directory comprises an application that is automatically executed by the processor when a specified event occurs. The specified event occurs when the portable device is energized, reset, or when a predefined interval of time has elapsed during which the user has not actuated any of the controls on the portable device. The application is preferably user selectable.

The data that are presented to the user in the display can comprise a menu having a plurality of lines. A title line of the menu is not selectable by the user and scrolls off the top of the display as the user selectively scrolls downwardly through the plurality of lines comprising the menu, in order to access a line that was initially below a bottom line previously displayed on the screen.

The machine instructions preferably cause the processor to enable the user to selectively scroll through the lines of a menu at either a first rate or a second rate, where the second rate is substantially greater than the first. When scrolling at the second rate, the processor causes a top line showing on the display to change by a predefined number of lines within the list. The predefined number of lines is greater than one. The second rate is selected when the user actuates one of the plurality of controls for at least a predefined time interval.

A user selectable format is preferably applied to specific data when the data are displayed, to control how the data appear on the display. The pairs of controls are used in a different manner for editing data in the display. When used for editing, the Up control is actuated to change a selected item to a next successive logical value, and the Down control is actuated to change the selected item to a previous successive logical value. Also, when editing, the Action control is actuated to select a different item, and the Back control is actuated to implement the change selected with at least one of the Up and Down controls.

The portable device also preferably includes an alarm that is controlled by the processor in response to the machine instructions. The machine instructions cause the processor to display an alarm time and an announce time interval that are stored in the memory. The announce time interval indicates a time prior to an alarm time when the processor will actuate the alarm, thereby providing an advance warning to the user of an event scheduled for the alarm time.

A further aspect of the present invention is directed to a portable device for storing and managing data accessed by a user that also includes a memory and a processor. When implementing the machine instructions stored in the memory, the processor enables the user to actuate at least one of the plurality of controls to selectively scroll through the plurality of lines at one of a first rate and a second rate, where the second rate is substantially greater than said first rate. Other features of this aspect are generally consistent with the above discussion.

Yet another aspect is similarly directed to a portable device wherein the machine instructions enable the user to selectively control a format in which the personal information data are shown on the display. The format includes the announce time, which as noted above, is the interval of time prior to an impending event at which the processor will actuate the alarm to provide the user with an advance warning of the impending event. The user can selectively display at least one of a date and a time in a plurality of different forms, and the format preferably includes an alarm time.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 4 is a logic diagram showing the response of Nomad when the user presses a Back button;

FIGS. 6A and 6B illustrate two display screens of an exemplary menu, showing the icons that may appear when the user scrolls through the list;

DESCRIPTION OF THE PREFERRED EMBODIMENT

A preferred form of the present invention is embodied in a combination pager and data management device, which is referred to herein as "Nomad." However, it is contemplated that the present invention can also be practiced using other electronic devices that are physically compact and readily portable. To be carried on a user's person, the device must have a relatively small display area and be limited to only a few controls for controlling the data that are displayed and the functions executed by the device. The present invention could also be applied to a combination cellular phone and data management device that would offer virtually all of the compact size, portability, and other advantages of the preferred embodiment of Nomad described below. Such devices should have enhanced utility compared to existing portable PIM devices, and the functionality and ready portability of such devices will more likely encourage the typical user to carry the device at all times. Accordingly, it is not intended that the scope of the present invention be limited by the disclosure of the present preferred embodiment of the invention that is embodied in a combination pager and PIM device.

User Interface

Figure 1:
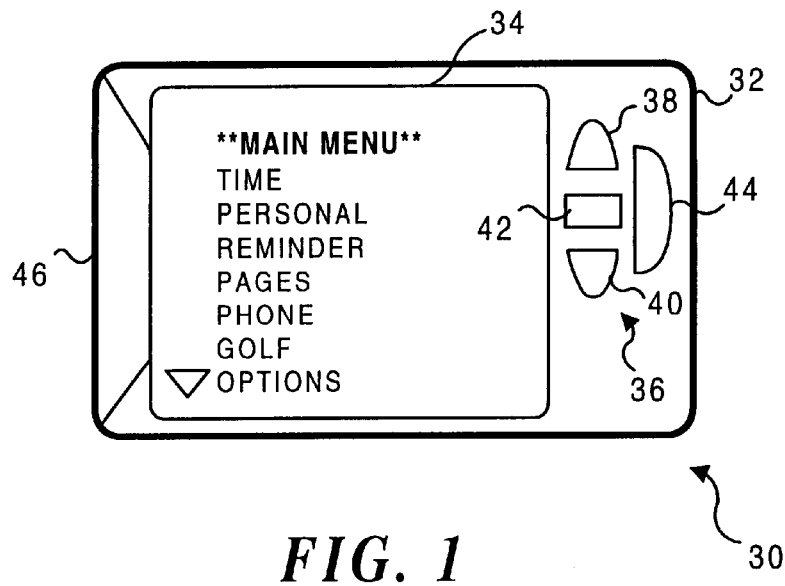
FIG. 1 is a plan view of a combined pager and data management device embodying the present invention (i.e., "Nomad")

A top view of a Nomad pager and data management device 30 is shown in FIG. 1. Nomad includes a housing 32 and has a user interface that includes a keypad 36 disposed on the top of housing. Keypad 36 has four buttons that are used to control the display and the functions performed by Nomad in connection with its conventional paging function and its PIM data management functions. The buttons comprise an Action button 42, a Back button 44, an Up button 38, and a Down button 40. The buttons navigate the user through a directory/menu hierarchy like that shown in FIG. 1. The Action/Back buttons are paired as opposites having a pair dual functionality respectively similar to that of the Enter and Escape keys on a conventional QWERTY keyboard of a personal computer. The Action button takes the user in (i.e., to a selected lower level) and the Back button takes the user out (i.e., to a next higher or parent level) in a hierarchical data structure. In addition, the Action button is also used to implement a selected function. The Up/Down buttons are another functional pair of buttons that respectively change the selected line up and down within a display 34 and cause the lines to scroll to view lines that are currently off the display, either above the top or below the bottom of the display. Examples illustrating how the Action and Back buttons function and how the Up and Down buttons are used in the simple user interface of Nomad are disclosed in detail below. Display screen 34 is preferably a liquid crystal display (LCD), which in the preferred embodiment can display a maximum of eight lines, with 17 characters per line. Other types and sizes of displays can alternatively be used.

Figure 2:
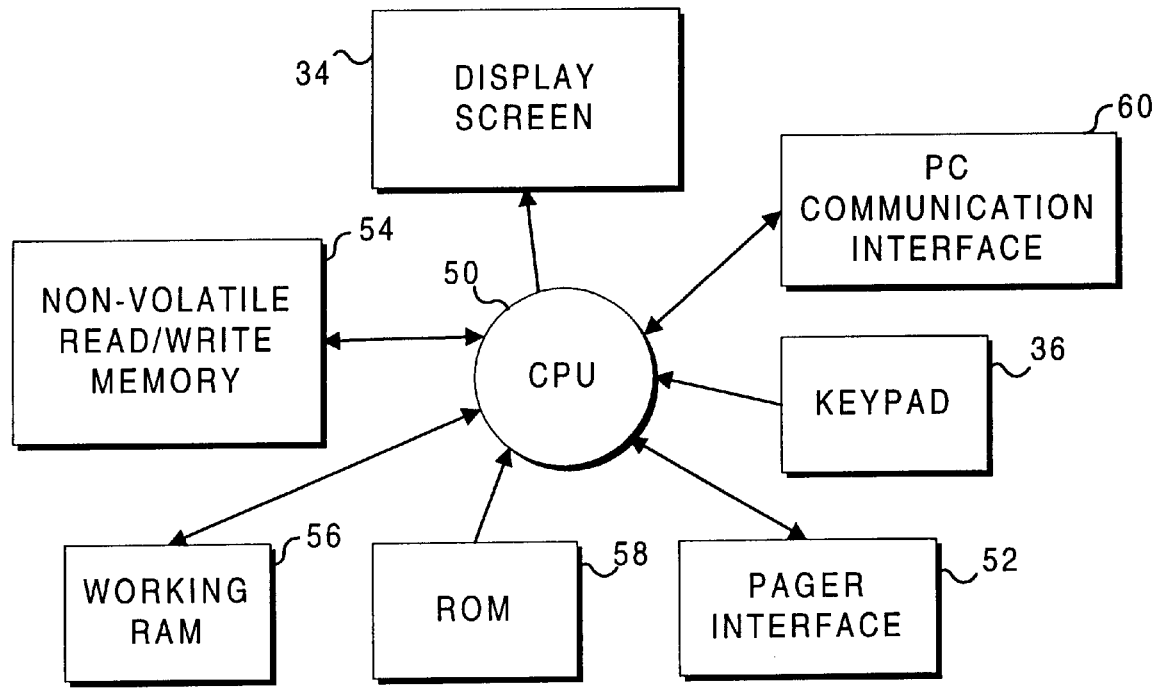
FIG. 2 is a schematic functional block diagram of Nomad.

Referring now to FIG. 2, a block diagram illustrates the functional components comprising Nomad. An eight-bit central processing unit (CPU) 50 implements the software controlled functions performed by Nomad. CPU 50 is coupled to display 34 so that text and graphic icons generated in accord with the controlling software appear on the display. Data that are downloaded or otherwise entered into Nomad are stored in a non-volatile read/write memory 54, and this memory is bidirectionally coupled to the CPU, which reads and writes the data in a serial stream. Since the data stored in non-volatile memory 54 is likely to more extensive than a user would care to enter using only the four buttons, such data are most efficiently entered through a PC communication interface 60. Preferably, this interface comprises an infrared sensor/transmitter 46 (shown in FIG. 1), which communicates through an infrared (IR) data port of a personal computer (PC) (not shown). The data are downloaded from the PC to Nomad through the PC communication interface. In the preferred embodiment, the CPU is preferably a Zilog Corporation, type Z80™ running at from two to four MHz. The capacity of non-volatile read/write memory 54, which is provided on an electrically erasable programmable read only memory (EEPROM) circuit, is only about eight Kbytes in the preferred embodiment. A working (static) random access memory (RAM) 56 has a capacity of about four Kbytes in the preferred embodiment and is also coupled bidirectionally to the CPU. The RAM provides volatile storage for instructions that are executed by the CPU when small application programs called "applets" are run on Nomad, and storage for temporary data, such as register values. Default values for configuration options and other variables are stored in a ROM 58, which has a capacity of only about 10–20 Kbytes. The ROM is also used to store the operating system software for the device that controls the basic functionality of Nomad, e.g., its conventional paging function, and other functions implemented by Nomad. An object is any received Nomad-specific block of data or code with the exception of a full download (a full download from a PC is sent, not as a collection of objects, but as a block of data in an internal, condensed format). A block of objects can be received from the PC. Or, a single object can be received from a PC (via IR), from another device (via IR), or from the paging network (via page). Objects include such items as appointment records, phone records and datasets, general list records and datasets, applets, and applet-specific datasets.

Transmittal of Nomad-specific objects between the Nomad device and the PC or another Nomad device is a key feature offered to users of Nomad devices (whether they be pagers, watches, digital diaries, game units, or other small devices). The ability of Nomad devices to receive and execute a variety of different applets, including applets designed by third parties, is another key feature that enhances the usability of these devices. Details on data transmission techniques and applets are provided below.

The preferred embodiment of Nomad supports a hierarchical directory structure very much like that used in a conventional computer file system. While use of such a directory structure is well known in laptop computers, a hierarchical structure of this type is novel in connection with the organization, access, and display of data stored on a very small portable device like Nomad having such a limited amount of memory for storing data and only a few lines in which to display the data. The directory structure used in the preferred embodiment includes a root node, which is at the top of the hierarchical directory structure. Typically, a software application is selected by the user to automatically execute at the root node when Nomad is initially turned on, reset, or after a predetermined period of time has elapsed without any user input. The application that runs in the root node may simply result in a display of the highest levels of the directory structure, thereby enabling the user to select a specific directory and subdirectory in the hierarchy for accessing desired data or running a specific application. Alternatively, the application may carry out an initial function and then display a top level menu.

To move up or down through the hierarchical levels that are viewable on display screen 34, Action button 42 and Back button 44 are employed. Specifically, when a directory is selected on display screen 34 and Action button 42 is depressed, the subdirectories and any other elements for the next lower level of the selected directory in the hierarchy are then displayed. To move back up to the next higher level in the directory hierarchy, Back button 44 is depressed. Thus, using the Action and Back buttons, the user can easily move through different levels of the directory structure. A goal is to make the user who is accustomed to the directory structure used on personal computers feel comfortable with the user interface and access to different directory levels that are employed on Nomad.

The data stored in Nomad is of at least four types, including menus, static databases (lists), dynamic databases (stored pages), and small software application programs (applets). Regardless of the type of data being accessed, the user interface functions in an entirely consistent manner. However, the control buttons are context sensitive within the framework of the consistent interface. The following examples should help to clarify how the consistency of the user interface is maintained in a context sensitive manner on Nomad.

As an example of the heterogeneous types of data that can be accessed, the following menu tree might be displayed to a user when Nomad is initially energized:

\*\*MAIN MENU\*\*

INBOX

REMINDERS

GAMES

If the user selects "INBOX" with the Action button, the following menu of different stored page messages night be displayed:

\*\*INBOX\*\*

PERSONAL

NEWS

Page messages specifically sent to the user are stored in the "PERSONAL" directory, while page messages of interest to a number of people or of a non-personal or public nature are stored ii the "NEWS" directory. If the user selects the PERSONAL directory item, a Table of Contents (TOC) view will present a list of the stored personal page messages, such as:

\*\*PERSONAL\*\*

$\frac{1}{10}$10:50 AM CALL ME $\frac{1}{10}$11:00 AM MEET

The user can use the Up or Down buttons to move up or down in this list and then select a currently highlighted line by pressing the Action button, causing the display to move down one hierarchical level. If the user presses the Action button while the first item is highlighted, the contents of the selected page message will be presented on display 34, as in the following:

$\frac{1}{10}$10:50 AM

CALL ME AT 1-800-123-4567 TO

ARRANGE A MEETING.

Again, the Up and Down buttons can be used to scroll up or down in the displayed page message. Now, however, if Action button 42 is depressed, a further lower directory is displayed that is clearly context sensitive, since it relates not to further details of the current displayed item, but instead to options for processing the currently displayed item. Pressing the Action button brings up the following options on the display:

\*\*OPTIONS\*\*

DELETE THIS PAGE

PROTECT THIS PAGE

DELETE ALL PAGES

The first option simply deletes the last stored page that was displayed before the Action button was last pressed. The second option protects that stored page, preventing it from being deleted, and the last option deletes all, stored pages in the PERSONAL directory. The user employs the Up and Down buttons to select one of the displayed options and then presses the Action button to implement the option. Alternatively, if the user presses the Back button, the display moves up in the hierarchy, again displaying the previously displayed personal page message. If the user presses the Back button after the DELETE ALL PAGES option has been selected and implemented, the result will be to move two levels higher in the hierarchy, so that the contents of the INBOX are again displayed, because all of the pages stored in the PERSONAL directory have now been deleted.

Suppose that when the MAIN MENU was displayed, the use selects REMINDERS. The following TOC view will then be displayed:

\*\*REMINDERS\*\*

$\frac{1}{10}$11:00 AM GRP MEET $\frac{1}{10}$11:30 AM FLY

Using the Up/Down buttons, the user can move to a desired item in this menu and then move to the next lower level in the hierarchy for that item by pressing the Action button. For the first item, the user would then see tile following:

$\frac{1}{10}$11:00 AM−20

GRP MEET AT ROOM 1001

ARRANGE FOR BREAKFAST

In this example, the "−20" indicates the announce time interval, so that the user will be alerted of the meeting 20 minutes before it is scheduled, i.e., at 10:40 am. Pressing the Action button moves down in hierarchy, bringing up a different set of options than in the case of stored pages. Specifically, pressing the Action button will cause the following to appear on display 34:

\*\*OPTIONS\*\*

DELETE

EDIT

SEND TO OTHER DEVICE

By using the Up/Down buttons, the user can highlight a desired option and implement it by pushing the Action button. Pressing Back button 44 will move up in the hierarchy, displaying the previously displayed reminder. But, if the Delete option was selected and implemented, pressing the Back button will then move up two levels in the hierarchy, since the reminder on the previously displayed higher level has been deleted.

The context sensitive response of the user interface is also particularly evident in regard to the display of datasets (lists) that have different formats and different types of content. The hierarchical structure for datasets is: List Name →TOC View→Record View→Options. For example, a list entitled "MY LISTS" might appear as follows on display 34:

\*\*MY LISTS\*\*

PHONES

REMINDERS

GROCERIES

Selecting REMINDERS and pressing the Action button will drop to the next lower hierarchy level, to display the TOC View. If the user selects a specific reminder and presses the Action button, details of that reminder record will be shown. If the User then presses the Action button, the Options screen will be displayed, as described above. However, if the user selects the EDIT option, the following lower hierarchy menu will be presented:

\*\*EDIT FIELDS\*\*

DATE AND TIME

MESSAGE

The list of options presented depends on the type of dataset (i.e., its fields) from which the list was displayed. Note: if the user was previously viewing a CONTACTS data record, the EDIT option might display fields for editing NAME, WORK PHONE, HOME PHONE, ADDRESS, etc. If the list of editable fields is longer than will fit on one screen, the Up/Down arrow icons will be displayed as appropriate, and the fields not visible can be accessed by scrolling the display, using the Up/Down buttons, when the selected field reaches the first or last line previously visible.

If MESSAGE is selected when the Action button is pressed, the message will be displayed with a single character highlighted, as indicated by the bold font character "G" in "GRP" for the following example:

GRP MEET AT ROOM 1001
ARRANGE FOR BREAKFAST

The user can then use the Up/Down buttons to change the character; the Action button moves the selected character to the next character in the text and the Back button completes the edit. When editing a date/time instead of a character, the date/time field is highlighted, and the Up/Down buttons move through logical consistent values, e.g., JAN, FEB, MAR, etc. Although the edit mode functions of the control buttons are different that in other instances in which the buttons are used in the user interface, the edit functions apply consistently every time that an EDIT option is being implemented—for all types of data.

When an application program (applet) is executing on Nomad, it may selectively implement different user interface options and functionality for the controls. However, the default control functions explained above are available for use in applets with minimal additional programming and thus will likely be preferred by most programmers.

Figure 3:
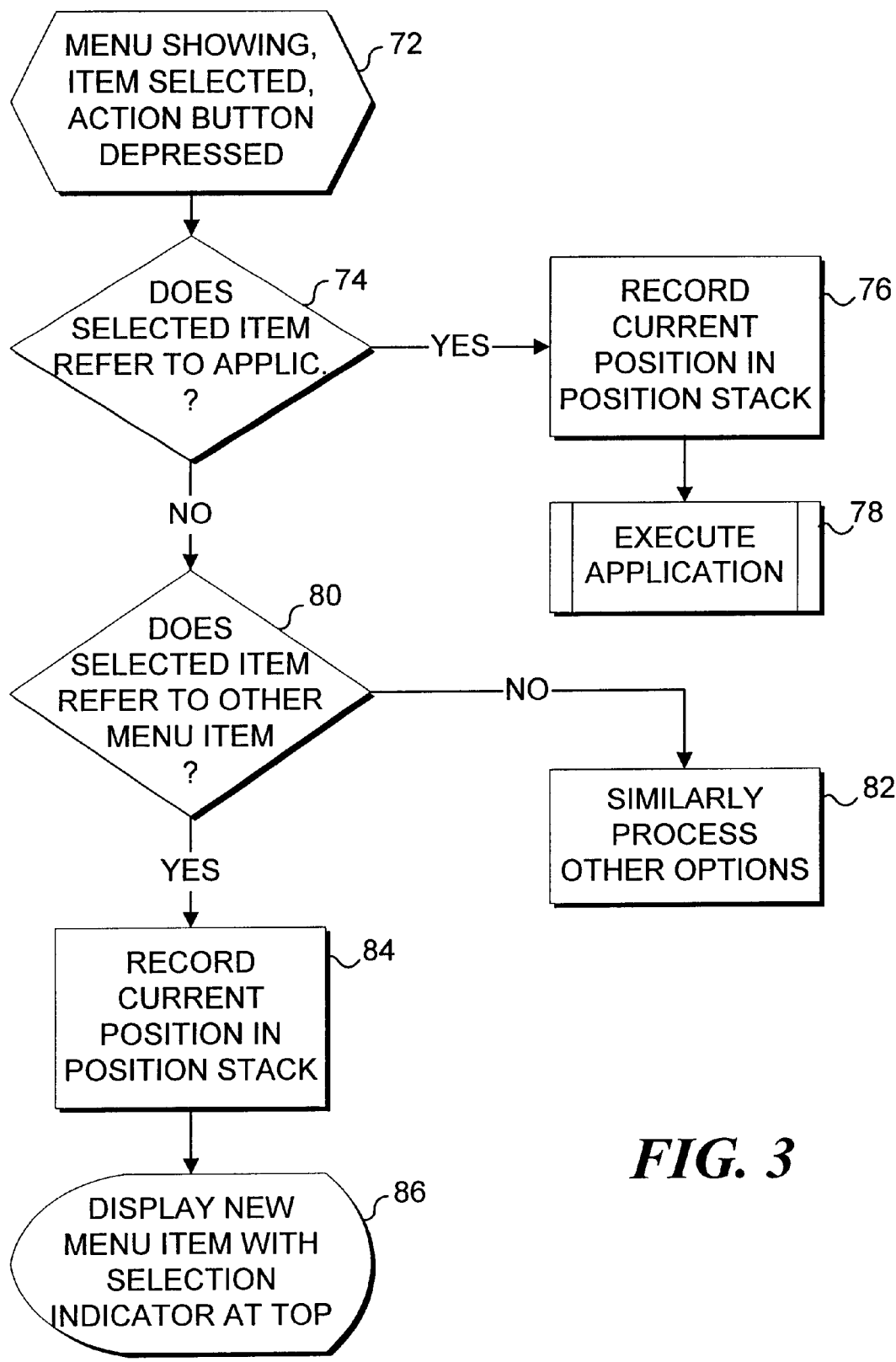
FIG. 3 is a logic diagram illustrating how Nomad responds to an Action button when a menu is displayed and an item in the menu has been selected.

Details of the logic implemented in the preferred embodiment of Nomad for the situation in which a menu structure is showing on display screen 34, an item has been selected, and the Action button has been depressed are illustrated in FIG. 3. The given conditions that exist when carrying out this logic are set forth in a block 72. Before discussing the logic diagram, it should be noted that Nomad is essentially a state machine in which the depression of the Action, Back, Up, or Down buttons on the interface represents different events in response to which the operating system carries out specific actions or operations. Conventional flowcharts are generally not an optimum vehicle for representing the change in state of a state machine that occurs in response to an event, but should make clear how logic is applied to achieve each of the user interface functions in the present case. FIG. 3 simply illustrates the response of the processor to the Action button being depressed, for the conditions set forth in block 72.

A block 74 in FIG. 3 determines if the selected item refers to an application. If so, a block 76 records the current position of the selected item in regards to the displayed menu in a position stack. An affirmative response to decision block 74 enables the processor to recognize that the user pressed the Action button to start the application referenced on the currently selected line. As noted in a block 78, the application that was selected at the time the Action button was depressed is then executed. Alternatively, referring back to decision block 74, if the selected item does not refer to an application, a decision block 80 then determines if the selected item refers to another menu item. If so, the processor will recognize that the Action button was pressed to move to the next lower level in the hierarchical menu structure. If the selected line is not a menu item, a block 82 provides for similarly processing any other options, such as starting a timer, or carrying out some other action. However, if the selected item refers to another menu item, in accord with a block 84, the current position of the item selected is recorded in the position stack. Thereafter, a block 86 displays the new lower level menu structure corresponding to the previously selected menu item and selects the top line of the display screen.

Conversely, if the user presses Back button 44, that event displays a different series of logical actions as indicated in FIG. 4. Starting from a block 90, in response to the user pressing the Back button, a decision block 92 determines if the items currently on the display screen are already at the top of the hierarchical menu tree. If so, a block 94 indicates that there is no change in the display, since it is not possible to move to a higher level when already at the highest hierarchical level. If the displayed items are not at the top of tile hierarchical tree, a block 96 pops the most recent position data from the top of the position stack. It will be recalled that in connection with FIG. 3, when the Action button was used to move to a hierarchically lower level in the data structure, the level previously selected is retained in the position stack. That position data is then recovered in block 96 of FIG. 4 to move back to the previously selected item in the next higher hierarchical level.

In a block 98, the logic then proceeds to the position indicated by the position data, and a block 100 re-renders the display. The result of the step carried out in block 100 is to display the hierarchical data structure one step above the previously displayed level, with the menu item at that level again selected.

Figure 5:
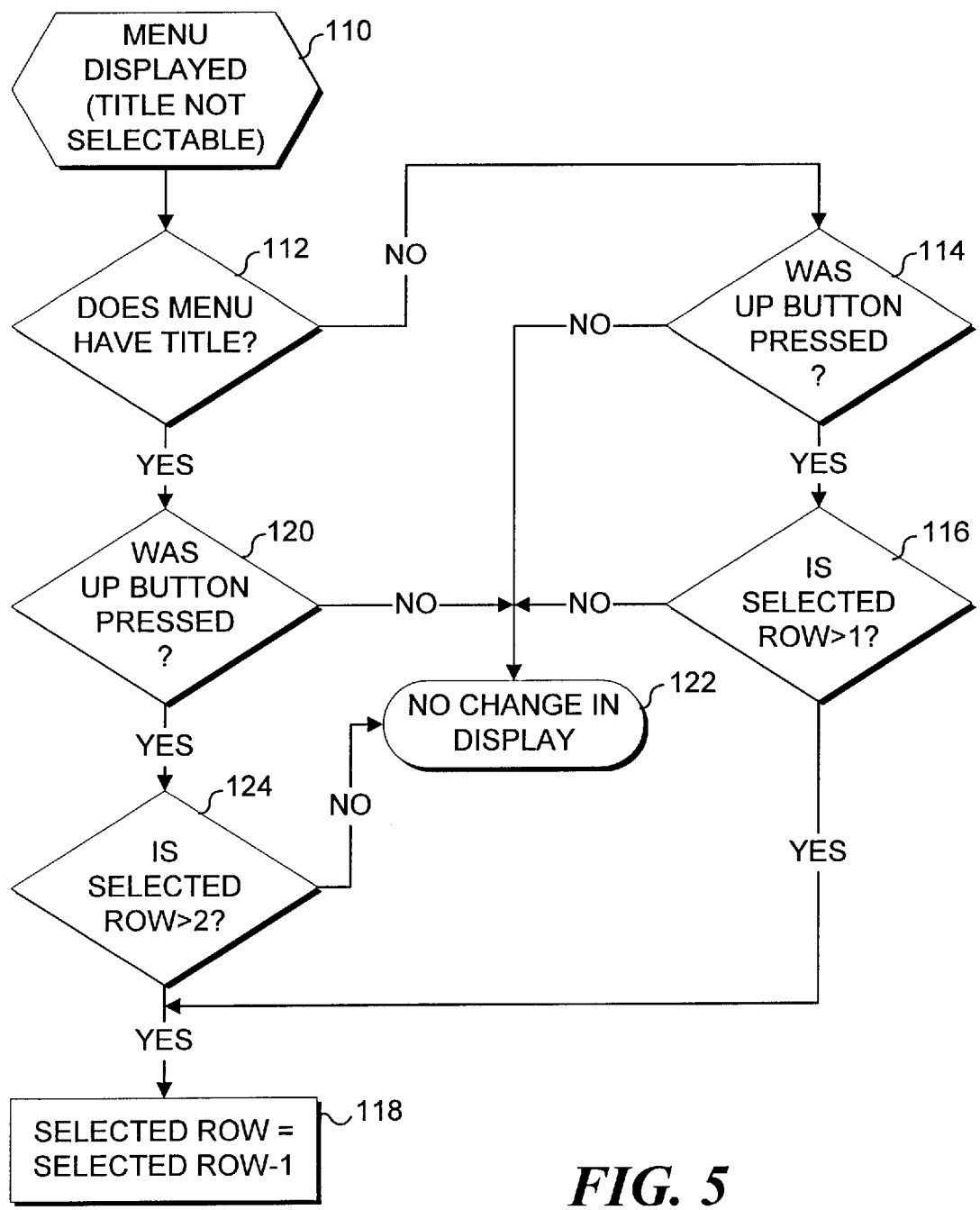
FIG. 5 is a logic diagram illustrating how the menu title, which is not selectable, is handled in response to the user pressing an Up button.

The list of options that are presented to a user on display screen 34 can comprise a menu in which each of the options are at the same hierarchical level. While not required, the menu will normally have a title that appears on the top row of the menu to remind the user of the current location in the directory structure and to identify the menu category for each of the items that are listed as options below the title line. The remaining lines in this display typically contain menu items or other options from which the user can make a selection to move to a lower menu level or to implement a particular desired action. The manner in which the preferred embodiment of the present invention handles the title of a menu relative to other items listed in a menu is illustrated in FIG. 5.

As noted in a block 110, the initial assumption is that the menu is presented on display screen 34 to enable the user to select one of the options included therein. Since the title is not an available option, it is not selectable. A block 112 determines if the menu has a title, and if not, a decision block 114 determines if Up button 38 was depressed. If it was, a decision block 116 determines if the currently selected item or line of the menu is greater than one. This step simply checks if the selected item is below the first line of the current menu. If it is, the logic proceeds to a block 118, which changes the selected row to the immediately preceding line of the menu (i.e., the line number in the menu of the previously selected row minus one).

Referring back to decision block 112, if the current menu has a title, it is presumed to be on line one of the menu. If so, the logic proceeds to a decision block 120, which determines if the Up button was pressed (i.e., did the event corresponding to the user pressing the Up button occur). If not, the logic proceeds to a block 122, in which no change is made in the display (i.e., there is no change in state). If the Up button was pressed, but as indicated in a decision block 124, the selected row is not greater than row number two, no change occurs in the display in accordance with a block 122, because from the second line in the menu, the Up button cannot be used to select the menu title on the first row or line of the menu. However, if the Up button was pressed and if the selected row is greater than two or below the second line of the menu, then in accordance with the logic presented in a block 118, the selected row is set equal to the previously selected row minus one (i.e., the selection shifts to the line above the previously selected line). In summary, the logic shown in FIG. 5 indicates that the Up button has no effect if the menu does not have a title and the current selection is already on the top line, or if the menu has a title and the current selection is on the second row or line immediately below the menu title. In all other regards, the Up button has the effect of shifting the selected row to the immediately preceding line in the menu.

Each time that Nomad is energized, reset, or after a predefined period of time, the display returns to a root node. By default, an application is set to execute at the root node of the hierarchical structure. Further, the root node is always at the topmost level of the directory structure. Any of a certain class of software applications can be selected by the user to initially execute at the root node. A requirement of any application in this class is that it must be possible for the Action button to bring up the main menu in any application that is assigned to the root node of the hierarchical structure. Alternatively, if an application is not assigned to the root node, the main menu will appear in display screen 34 when Nomad is energized, reset, or after a predefined period of time in which no activity by the user occurs. This requirement insures that the main menu is always accessible, either from the application that runs by default at the root node of the hierarchy, or by virtue of the main menu being immediately displayed at the root node. A user application assigned to the root node might display the current date and time for 5 seconds, and then display the main menu, or it might only show the main menu after the user has pressed the Action button. An example of a "main menu" is illustrated in FIG. 1 on display screen 34.

Figure 7:
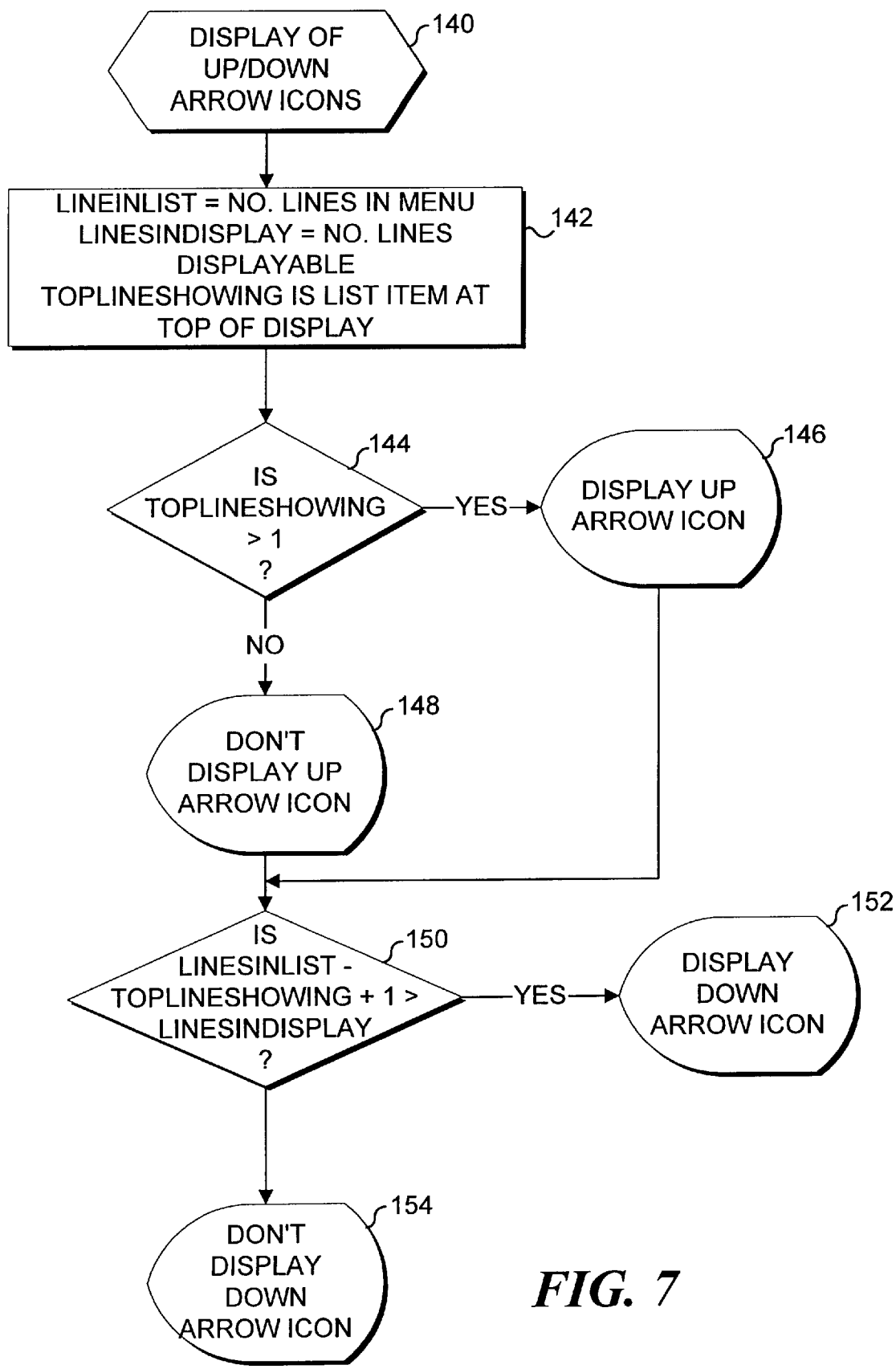
FIG. 7 is a diagram of the logical steps implemented by Nomad in determining whether the Up arrow and Down arrow icons are displayed.

Since a menu or list of items presented on display screen 34 may exceed the total number of available lines that can be simultaneously presented to the user, Up button 38 and Down button 40 enable the user to selectively scroll through the list of options and to access lines in the list that are either above the top line currently displayed or below the bottom line currently displayed. Thus, the Up and Down buttons on the hardware user interface for Nomad are comparable to the Up and Down cursor controllers on the cursor control pad of a conventional personal computer. However, unlike the Microsoft Windows graphics environment display, the display screen on Nomad does not include a scroll bar. Instead, to alert the user that additional lines not showing on the screen are either above the top line currently displayed or below the bottom line currently displayed on the screen, the preferred embodiment of Nomad provides graphic icons positioned to the left of the top and/or bottom line of the display screen. These graphic icons are preferably an upwardly pointing arrowhead (a graphic character) to indicate that a line included in a currently selected list menu items or options is above the top line shown in the display screen, and a downwardly pointing arrowhead (also a graphic character) that appears if one or more lines in a list are below the last line currently seen by the user at the bottom of the display screen. The logic controlling the display of the upwardly pointing arrowhead and the downwardly pointing arrowhead is illustrated in FIG. 7, beginning at a block 140. In this Figure, the arrowheads are referred to simply as up and down arrow icons. A block 142 initializes several variables, including a "LineinList" variable is set equal to the number of lines in the current menu or list. A variable "LinesinDisplay" is set equal to the number of lines that are displayable on the display screen at one time. Finally, a variable "TopLineShowing" is set to the list item or line that is currently visible at the top of the display screen.

Next, a decision block 144 determines if the variable TopLineShowing is greater than one, i.e., is the top line on the display screen below the first item in the list of options currently being displayed to the user. If so, a block 146 provides for displaying the upwardly pointing arrowhead. The user is thus alerted by the appearance of this icon in the display that one or more lines or options in the list are not visible above the current top line on the display screen. Conversely, if the TopLineShowinig is the first line in the list, a block 148 indicates that the upwardly pointing arrowhead is not displayed. Following blocks 146 or 148, the logic proceeds to a decision block 150 that determines if the variable LinesinList minus the variable TopLineShowing plus one is greater than the variable LinesinDisplay. If so, a block 152 provides for displaying the downwardly pointing arrowhead. Otherwise, a block 154 indicates that the downwardly pointing arrowhead is not displayed. Decision block 150 simply determines if the last line in the list is currently visible to the user on the display screen and if not, presents the downwardly pointing arrowhead in the display to alert the user that additional lines of the list below the last line seen are not visible.

An example of the use of the upwardly pointing arrowhead and downwardly pointing arrowhead in display screen 34 is illustrated in FIGS. 6A and 6B. In FIG. 6A, a Games menu is illustrated, showing the title **\*\*GAMES\*\* as the first line of the menu, with an option 130 selected immediately below the title. Option 130, entitled BlackJack is shown in bold to indicate that it is the currently selected line. (It should be noted that if the user attempts to select the title using Up button 38, the system will not change the displayed options.) On Nomad, the currently selected line appears in "reverse video format," i.e., a black band with white letters. A downwardly pointing arrowhead 132 is displayed to the left of the list of options on the bottom line of display screen 34, indicating that additional options in the Games menu are below the last line presented on the display. In FIG. 6B, the user has pressed tile Down button, moving the selection to an option 136, which is the line below the last line visible in FIG. 6A. As indicated in FIG. 6B, option 136 is "Backgammon," which is again shown in bold font to indicate that it is the currently selected line. Since the options in the Games menu have caused the top line, which is the title, to scroll off the top of the display screen, an upwardly pointing arrowhead 134 is now displayed to the left of the option for BlackJack on the top line of the display screen. Since additional options still remain below selected object 136, downwardly pointing arrowhead 132 is still displayed. However, if Backgammon were the last option of the Games Menu, downwardly pointing arrowhead 132** would not be displayed.

Figure 8:
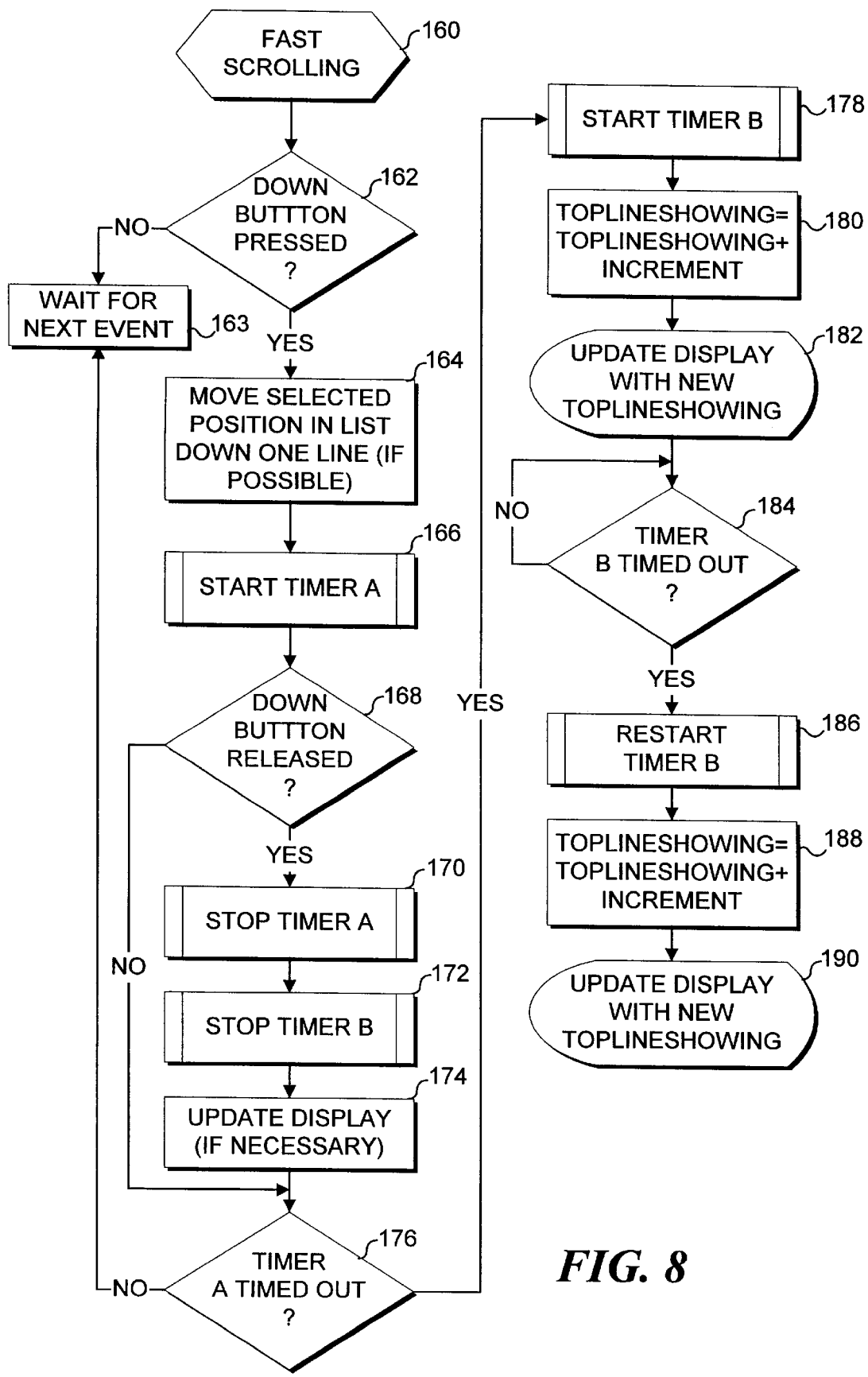
FIG. 8 is a logic diagram showing the steps used in handling fast scrolling on Nomad.

While scrolling through a short list of options or menu items one at a time is acceptable, for substantially longer lists, the process is too slow. Accordingly, the preferred embodiment of Nomad provides the user a selectable and customizable faster scroll rate than the slower one line scrolling that occurs with each depression of the Up or Down buttons. By holding either the Up button or Down button depressed for longer than a predetermined time interval, the faster scrolling rate is initiated. In implementing the faster scrolling rate, the top line currently displayed from the list being reviewed changes by a predefined number of lines up or down through the list, depending upon which of the two buttons is held depressed for the predetermined time. Details of the logic implemented to carry out these functions are illustrated in FIG. 8.

As indicated in a block 160, fast scrolling proceeds through a series of logic steps, beginning with a decision block 162. This decision block determines if the Down button is depressed and if not, a block 163 indicates that the system waits for the next event to occur. If the Down button has been pressed in decision block 162, a block 164 moves the selected position in the list of options down to the next line, assuming that the selection is not already at the last line of the list. Next, a block 166 starts a timer A. Timer A is used to determine whether the Down button is held pressed for the predefined time required to initiate the faster scrolling. A decision block 168 determines if the Down button has been released, and if not, cycles back to repeat the check in decision block 168. A block 170 responds to the release of the Down button by stopping timer A. Next, a block 172 stops timer B (if it is running). A block 174 updates the display, either as a full screen update, or if the screen is slow to redraw, just an update of the first one or more lines in the display.

A decision block 176 determines if timer A has timed out, and if not, proceeds to block 163 to wait for the next event to occur. However, if timer A has timed out, indicating that the Down button has been held for at least the predefined time necessary to initiate the faster scrolling rate, the logic proceeds to a block 178 in which timer B is started. Timer B determines how long each new set of lines should be displayed. It should be noted that both timer A and timer B are one-shot timers that need to be restarted each time that an appropriate event occurs. Since the faster scrolling rate is now initiated, a block 180 changes the TopLineShowing in the display so that it shifts downwardly through the list from the previous TopLineShowing by a predefined increment or number of lines in the list. The user has the option of setting the predefined increment by which the top line of the display is changed with each screen update. The typical value might be eight lines in the list currently being displayed. Thus, for example, if the previous line at the top of the display was line number 4 of the list, the top line would be changed to line number 12 in the list if the predefined increment is set to eight lines. A block 182 then updates the display to show the new TopLineShowing from the list. A decision block 184 determines if timer B has timed out, and if not, loops until that event occurs, which maintains the current screen sufficiently long for the user to decide whether to terminate the fast scroll rate by releasing the Down button.

After timer B times out, which corresponds to the length of time that the changed display will be presented to the user, a block 186 restarts timer B. Then, a block 188 again resets the TopLineShowing in the display screen, moving down through the lines in the list by the predefined increment from the last TopLineShowing. A block 190 updates the display with the new TopLineShowing, again, either as a full screen update, or at least one or more of the first lines of the display screen, depending upon the rate at which the display screen redraws. This process of incrementally changing the TopLineShowing in the display screen continues until the user releases the Down button.

An analogous process is implemented when the user presses the Up button, but instead of changing the TopLine-Showing to the previous TopLineShowing plus the predefined increment during the fast scroll rate, it is changed to the previous TopLineShowing minus the predefined increment.

When setting up Nomad using a personal computer, the user has the option of selecting the number of lines incremented during the fast scrolling process each time that the line in a list set to the TopLineShowing is changed. In addition, the user can set the time interval for timer A. This time interval for timer A will typically range from about 0.5 to two seconds. The time interval for timer B can also be set by the user and will typically range from about 0.1 to one second, depending on the speed at which display screen 34 updates. Clearly, if display screen requires longer to redraw even the first line than the duration of timer B, the user will not see the new TopLineShowing before the processor shifts to the next new TopLineShowinig.

Another aspect of the present invention related to user selectable options pertains to the ability of the user to define a format for the data that are presented on display screen 34. For example, in connection with the PIM data maintained by the preferred embodiment of Nomad, the user can selectively determine how to display the time at which events are scheduled. Thus, time can be displayed with seconds showing or alternatively, with only the hour and minutes of an appointment or event. Further, the user can determine whether to display the time in 12-hour or 24-hour format, and if in 12-hour format, whether to include an AM or PM indication with the time displayed. Likewise, the date of the scheduled event can be selectively set by the user to show an abbreviation for the day, i.e., Mon, Tue, Wed, etc. The month in a date can be indicated as a number or as a text abbreviation, e.g., 10 or Oct. The user can also determine whether to show the year and can control the order in which a date is presented, e.g., month/day, day/month, or year/month/day.

An additional option that is user selectable in regard to format is the announce time interval applied to an event. Typically, if an event is scheduled for 11:00 AM, and the announce time interval is set to zero, an alarm will sound on Nomad at 11:00 AM. However, if the user optionally sets the announce time interval to 10, a reminder data record will appear in the format 11:00 AM–010 to indicate that the user has elected to be alerted by the alarm 10 minutes prior to the scheduled 11:00 AM time at which an event occurs. Based upon the user's preference, considerable versatility is provided in alerting the user prior to the time at which the user must be at an appointment or other event will occur. Unlike prior art portable PIM devices such as the Timex Data Link Watch™, the preferred embodiment of Nomad enables the user to selectively choose different announce time intervals for different types of events, instead of simply selecting a global announce time interval that is applied to all types of events in the user's PIM schedule. For example, the announce time interval for events scheduled only as days, such as the birthdays of relatives and acquaintances, might be four days, while the announce time interval for appointments might be set to 15 minutes.

Data Transfer

Overview: In this section, we use the term data transfer to mean the transmission of Nomad-specific objects and data. Data records or sets, which store ordinary page information, when transferred to another Nomad device or the PC, are no longer considered pages, but instead are data objects that refer to pages.

Data transfer of objects to a Nomad pager can be achieved in one of two ways, via radio (page) or via IR. Data transfer from the Nomad can only be achieved via IR, because the Nomad pager has no mechanism for sending Nomad objects via page. Besides, not all carriers support two way paging. However, it is contemplated that the present invention can easily be adapted for use on bidirectional paging systems.

The whole process of receiving an object via page vs. via IR is quite different. In the case of the paged object, the user must be interrupted, because the page was unexpected. In the case of the object sent via IR, the process was deliberate, and the user not only knows that it is happening but what is being sent. As a result, the user can manually explore the objects received via IR. That is, there is no notification of the objects received.

Receiving Data on Nomad: Excluding manually-entered data, there are three sources for Nomad data, including a PC, another portable device, and the paging channel. There are two types of data; pages and objects. And there are two ways this data can be packaged, full download (complete download of Nomad environment) and single object. The valid combinations are described below:

Page: Nomad can receive ordinary pages and is able to support multiple cap codes.

Object from Paging Channel: Nomad is able to receive any single object via the paging channel. These objects could be PIM objects (new appointment, delete appointment, replace appointment, new phone number, etc.), data to be paired with non-PIM applets already resident, new applets, or new applet/data pairs. The data coming by itself can be single records or data sets containing one or more records.

Object from Portable Device: Same as above.

Object from PC: Same as above. In practice, the user may select a block of phone numbers for download, for example, which the data exchange software running on the PC sends as multiple individual objects.

Full Download from PC: The PC uses IR to download the entire Nomad environment—directory structure, RAM-resident applets and data, ROM applet headers, and data for ROM-resident applets. This download completely overwrites the previous environment, with the optional exception of the time and date.

The user interface for objects received via page have been described. For receiving an object via IR (from another Nomad or PC) or for receiving a full download from the PC, the user selects the "Data Transfer" menu item (by default, in the main menu). The display looks like:

Press Action for Data Transfer

The user can press the Back button (to cancel the data transfer) or press the Action button to continue. The user interface for receiving data is parallel to that for sending data. When the Action button is pressed, the display shows:

Connecting . . .

If the Nomad succeeds in synching up with another device before the timeout interval lapses, it displays:

Receiving data . . .

There is no way to abort the send process, and buttons won't work during reception. In practice, a user who wants to abort will simply move Nomad so it's not in the line of sight of the IR port on the other device. After interval has timed out or when the transmission is complete, the buttons will again function. The status of the operation should be shown (i.e., stage of data transfer, percent complete, etc.) during the transfer.

When the transmission is successfully complete, the display shows:

Data received successfully

From this point, the user presses the Back button to return to the options list. If Nomad times out trying to sync up with another device, it displays:

Error: Unable to find device and, again, the user presses the Back button to return to the options list. If the Nomad synchs up with a device, but the transmission fails part way through, it displays:

Error:

Transmission failed

The user then presses the Back button to return to the options list.

Data sets have a Changed bit. Any data sets that have records added, deleted, or changed have this bit set.

The full download is in two stages. First, the relevant data from the Nomad (pages and changed data) is sent back. The data exchange software running on the PC merges this new information with what it had planned on sending down. In stage two, the PC software sends the combined data to Nomad. In some cases, the combined result will be too large, since the PC cannot predict the amount of free memory available on Nomad. In this case, PC software will have to request user input to define the subset that should be transferred to Nomad.

Uploading Data from the Nomad

Upload Options: When the user decides to upload the information from the Nomad device to the PC, the user must first prepare the data exchange software for this event. After doing so, the user can shift to the Main Menu option, "Data Transfer." If the user presses the Action button, the confirmation message will be displayed as follows:

Press Action to

Transfer Data

If the Nomad device and the PC sync up the following message will appear:

Connecting . . .

During initialization, the Nomad device will be informed of the type of data transfer to take place based on the data exchange software settings. Further, when the user chooses to upload data, she also has the following options, which can be set on the PC in the data exchange software. These settings refer to pages only. The pages must be read, and, if of the object type, processed in order for them to be uploaded.

Upload Since (not currently available), Upload All: Currently, when an upload is invoked all acceptable pages are uploaded. Acceptable pages are those that are read and processed, if applicable. In the next version of the present invention, it is contemplated that the option will be added to upload pages that have been received since the last upload, such that duplicate pages are not uploaded time and time again.

Delete All Pages, Delete Unprotected Pages Only, Delete None: The data exchange software running on the PC has check boxes "Delete All Pages on Upload," "Delete Unprotected Pages Only," and "Delete None." If the user checks "Delete All Pages on Upload," all uploaded pages are deleted from the device.

Radio Status: When the user begins the transfer, all background running applets are automatically terminated (for example, stopwatch), and the paging antenna is turned off for the duration of the transfer. There is no user interface display to indicate this action has occurred.

Data Exchange System and PC Executed Software (Proteus)

Figure 9:
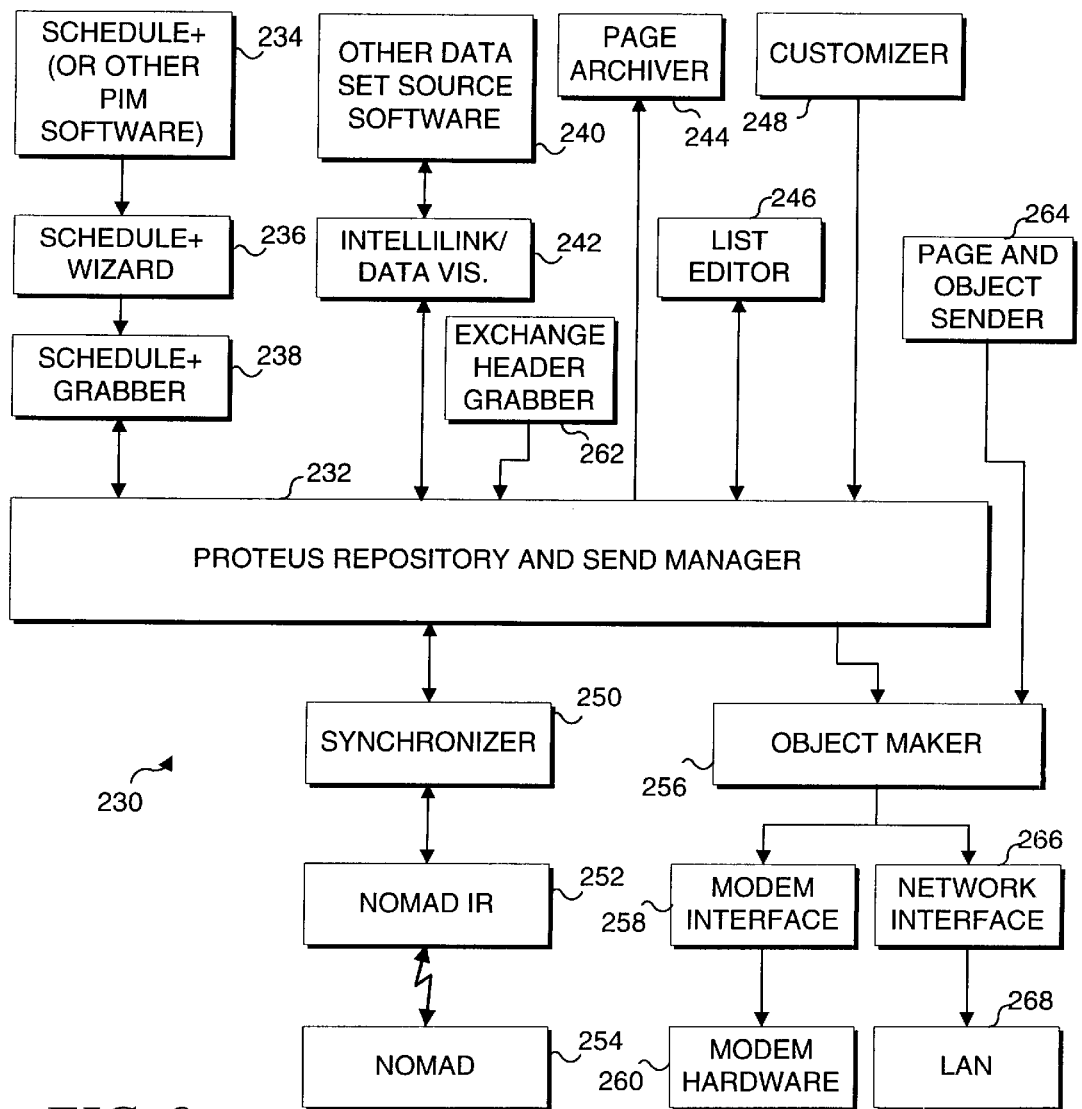
FIG. 9 is a block diagram illustrating the data exchange system between a personal computer and Nomad through an infra-red data port and via paging transmissions.

The software developed to facilitate data exchange between Nomad and the PC is currently called Proteus. This software is executed on the PC to permit data to be exchanged between Nomad and the PC as explained above. FIG. 9 in a block diagram that illustrates components 230 that are used for exchanging PIM data, applets, and other data between the PC and Nomad. A Proteus repository and Send Manager 232 serves as the control for any data exchange. Microsoft Corporation's SCHEDULE+™ PIM (or other PIM software) can serve as the source of data that is to be downloaded into Nomad, as indicated in a block 234. If using the SCHEDULE+ PIM, a block 236 indicates that a Wizard is provided to facilitate the data download operation, assisting the user in selecting specific portions of the PIM data that are to be downloaded. A block 238 provides a "grabber" for conveying data bidirectionally between the PIM software and the Proteus control software.

In addition to PIM applications, database applications and other programs can exchange data with Nomad, as indicated in a block 240. The other applications are coupled to the Proteus control through an Intellilink/Data Viz., as provided in a block 242. Also preferably coupled to the Proteus control are a Page archiver 244, a list editor 246 that is used for editing lists (such as To Do lists), a customizer 248, and an EXCHANGE™ header grabber 262. The customizer permits options to be selected that customize the operation of Nomad, as noted above.

A synchronizer block 250 is used for synchronizing data stored in the Nomad device 254 and in the Proteus Repository over an IR port 252. Also coupled to the control is an object maker 256, which is setup to provide paging objects that can be used to edit or update data within Nomad. As explained above, such objects are transmitted as a page. A modem interface 258 couples the object maker to modem hardware 260, so that the object can be conveyed over the phone lines to a paging transmitter and transmitted by radio to Nomad. Also coupled to the object maker is a network interface 266 that provides communication to other computers connected in a local area network (LAN) 268. A page and object sender is also directly coupled to object maker 256, bypassing the Proteus Repository and Send Manager.

Applets

The term "applet" refers to a software application routine that runs on Nomad. Applets can be firmware applications, installed in Nomad prior to delivery. Applets can also be new applications developed by third parties.

Firmware Applets

One applet is positioned as the root node applet. This applet is what the user sees when Nomad is first turned on. It could be the Time of Day applet, but need not be (depending on the paging carrier preference). The Action button automatically takes the user from this applet to the Main Menu. Also if the pager display times out, and the current applet does not retain the control, when the user presses any button, the display reappears with the root node in the foreground.

Time of Day Applet

The Time of Day applet is preferably the default root node. It displays the day, date, and time, with the time in the large font. And it supports either 12 or 24-hour display. The Time of Day applet may be appended with the values of various system variables (number of unread pages, number of unprocessed objects, date of the last upload, etc.). This option is based on the paging carrier preference.

Table of Contents View Applet vs. Record View Applet (for Lists)

In the following sections, various Nomad applets that handle and display list-able information are discussed. In order to understand the ways in which the data can be presented and manipulated, the difference between Record and Table of Contents views should be explained. The following example should make these two concepts clear.

Figure 10:
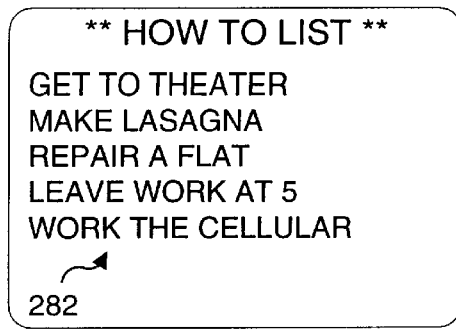
FIG. 10 illustrates an exemplary Table of Contents View display screen.

Assume that an applet on Nomad is called "How To". This applet contains a list of actions and, as the name implies, a description of how to carry out each action. If this list is displayed in the Table of Contents view, a screen 280 as shown in FIG. 10 would be displayed. This screen includes a list of action items 282. In this view, all items are listed one record per line. This view does not display the detail behind the items; however, the view allows easy navigation through the list and subsequently into the desired list option. When the user presses the Action button from this view, the result is the Record view of the selected item.

Figure 11:
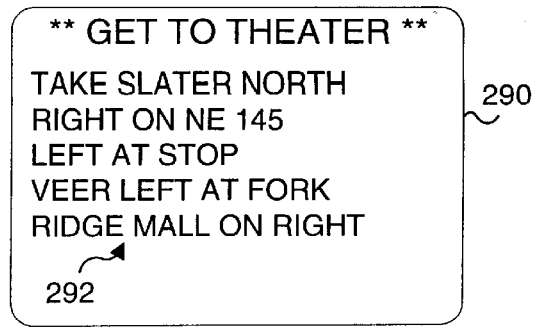
FIG. 11 shows and exemplary Records View display screen.

An exemplary Record view screen 290 is illustrated in FIG. 11. Screen 290 includes a list of directions 292 that define How to get to the Theater. In this view, one record is displayed on the screen at a time. If the user scrolls up or down while in this view, and if there is hidden text for this record, it will appear on the screen. Otherwise, an up or down press will take the user to the previous or next record, which is also displayed in Record view.

Peek View Applet—Most Recent Unread Page

This feature allows the user to glance at the most recent unread page from the Time of Day applet (the root node). The user simply holds down the Up button and the most recent unread page will appear on the screen while the button is depressed. The user cannot navigate to other pages from the Peek View. The Peek View employs automatic scrolling, when necessary, since releasing the Up button takes the user back to the Time of Day applet. Once a page is peeked at it is marked read and is no longer peekable. If the user attempts to peek, and there are no unread pages, the screen will display the message "No Pages".

Manual Scrolling Applet

This feature refers to scrolling while in record view of a list, but is not the same as navigating, which controls orthogonal movement through such structures as a Table of Contents list, an options list, or a directory hierarchy, etc. In Record View, one entry or record takes up the entire display. If the record has information that is not visible above or below the visible text, pressing the Up and Down buttons, respectively, will scroll to show the hidden text. When the user manually scrolls up or down, using the Up and Down buttons, and there is no hidden text either above or below the visible text for the current record, the subsequent or following record entry takes its place on the screen, respectively. To designate that the user has reached the end of the list, there is a blank entry with the text "List End". After which, a subsequent Down button press takes the user back to the beginning of the list.

Repetitive Scrolling Applet

To move quickly through a long list, the user holds down either the Up or Down button and, after a delay, the list scrolls repeatedly as long as that button is held down. Individual list items are displayed, one after another, in the forward or backward direction. The delay before scrolling (repeat delay) and the scroll rate (repeat rate) are definable on the PC; for example, they might default to two seconds of delay and a display rate of four names per second. When the button is released, scrolling stops at that point and any empty (undisplayed) fields are filled in. The repeat delay and rate are global parameters that apply to all lists on Nomad.

Line Scroll Applet vs. Screen Scroll Applet

Another manual scrolling option determines whether a single line or the entire screen is scrolled at a time (per Up/Down button press). This parameter can be set using software that controls transfer of the data between Nomad and the personal computer.

Automatic Scrolling Applet

If a line of text that is too long, i.e., more than 17 columns for the display of the preferred embodiment, is placed in a single line, the text scrolls left (marquee scroll); multi-line text that is too long for the display area scrolls up. An end-of-field character is placed at the end of a marquee-scrolled item to show where it starts/ends.

Note that automatic scrolling only occurs within fields. For instance, a telephone record that has a five line address field automatically scrolls, and all but the fifth line of the address fits on the screen when the record is displayed. In this case, the address text will scroll within the four visible lines so that the whole address field can be viewed. If the address field fits completely on the screen, but below it is another field, such as an e-mail address field (not visible), automatic scrolling would not be enabled. In order to view the remainder of the record, the user would manually scroll down.

The auto scroll delay and auto scroll rates determine after how many seconds scrolling begins and at what rate. Currently, only the auto scroll rate can be set using the software that runs on the personal computer for conveying data to and from Nomad. These parameters are global to all lists on Nomad.

Other Nomad Applets

Described below are some examples of basic applets that are included with firmware stored in the ROM of Nomad. The paging carrier may wish to customize these further (add functionality, etc.) using the Nomad Developer's Kit.

World Time Applet

The world time applet displays a list of the current times for different time zones. It is a read-only list, and presents no options to the user.

Stopwatch Applet

The stopwatch applet provides a basic chronograph. The accuracy of the stopwatch is limited to that of the driver time base. In the preferred embodiment, the stopwatch is accurate to ±⅛ second. When the stopwatch captures a time, the displayed value is adjusted to the nearest legitimate value. The stopwatch supports start, stop, split-timing, and reset. The functions of the keypad buttons are as follows:

|  | Stopwatch Not Running | Stopwatch Running |
|---|---|---|
| Action Button | Start | Start |
| Back Button | Back (Stopwatch Applet Preserves Timer Value) | Back Stopwatch Applet Continues in Background |
| Up Button | Shows Options | Grab Split |
| Down Button | Reset Stopwatch to 0 | None |

Pressing the Action button when the stopwatch is running initiates a lap time (a subsequent press overwrites the first time). A maximum of 5 splits can be captured per timing session. The time is initially indicated in the format mm.ss hh (minutes, seconds, hundredths). When the time rolls over to one hour, hundredths are dropped (hh:mm.ss). The timer stops automatically at 99:59.59, but the display is not cleared.

Customized Applets

Yet another valuable feature that can be provided by Nomad to pager carriers is the capability to tailor existing applets, create customized applets, or add third party applets in order to cater to their unique paging audiences.

There are two significant problems with developing applets that are suitable to be executed on Nomad. Because of the limited non-volatile memory size, the applet code must be relatively small in size. Further, because the RAM available is even smaller, the run-time footprint of the applet must be correspondingly smaller. In the preferred embodiment, a Basic language-like pseudo-code (p-code) language that is tuned to the application areas of Nomad was developed. Since each p-code stands for a series of more complex computations and algorithms, the overall size of the applet is greatly reduced. The applet is thus written in Basic or some other language on a personal computer and then a p-code interpreter is run to convert the high level source code to the p-code that is executed by the CPU in Nomad. An example of this type of interpreter is the BASIC STAMP™, which is distributed by Parallax Inc. The applet code must be designed so that only a small part of the code and any data required are loaded into RAM at any time. This approach thus successfully addresses the two problems noted above.

The applets are designed to operate as a state machine that responds to various events in the system. These events include any press or release of the any button on the user interface, completion of a time interval on an on-board timer, various hardware events, such as a low voltage alarm or receipt of a page, and various software events, such as when an applet temporarily loses or regains ownership of the display.

Figure 12:
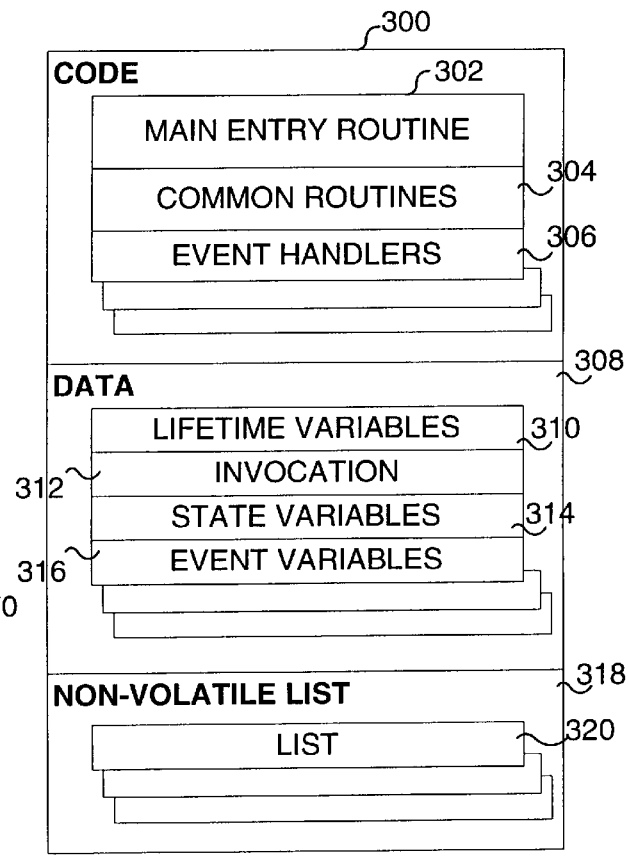
FIG. 12 is a block diagram of showing the structure of an applet routine.

FIG. 12 shows the structure of an applet. Applet code is divided into several code sections 300, and only a common routines code section 304 and an event handler code section 306 need be in RAM at any time for execution of the applet. A main entry routine section 302 is the first one to be executed when the applet is invoked and its primary purpose is to carry out tasks (such as to display a sign-on banner) before any events are processed by the applet. Thus, it is a type of event handler. The common routines code section is a set of routines that are called by two or more event handlers. They save the code for repetitive functions and work off invocation variables. For example, the Appointment applet may have a common routine ShowNextAppt, which is called by many event handlers, and is therefore included in the common page. The kernel could support multiple sets of common routines to further reduce RAM requirements, and the sets can be organized on a per state or per event handler basis. Alternatively, the developer of the applet may define the sets appropriately.

Event handler code sections 306 in the structure stress the point that the applet is designed as a state machine that is intended to handle specific events. The events are handled in each state of the machine via an appropriate event handler. Each event handler is a separate code section and it could include routines that are called only by that event handler.

A data section 308 also is divided into several sections to improve RAM usage. All of these sections except for the event variables are in an event variables section 316 can have initial values. A lifetime variables section 310 includes variables that persist across invocations. As opposed to a non-volatile list 318, language constructs like assignment can operate on the persistent variables, since they are maintained in RAM. Common variables are included in an invocation section 312. These variables are preserved between execution states but not across invocations, i.e., they are preserved when the applet changes from one state to another, but are lost when the applet terminates.

A state variables section 314 includes variables that are preserved during a specific internal state of the applet, but are lost or replaced by a new set as soon as the applet changes its internal state. Since an applet can process many events before changing its state, these variables have a longer life than event variables in an event variables section 316. The event variables are available during an event processing only and are lost as soon as the event handler completes its execution. These variables also include the local variables of routines that are defined within the same event handler section and the common routines.

At any time, the only elements that must be in RAM to execute the applet are the common section, the lifetime (or persistent) variables, the common variables, the state variables, the event variables, the common code, and the event handler. The most common transitions for an applet are between different events in the same state, so that only event variables and event code need to be swapped in RAM, and between different events in different states, in which case, state variables, event variables, and event code must be swapped in RAM. Since only one event handler can be executing at any given time, only one section of RAM is needed for all the applets in the system. This section of RAM will be used for storing the executing applet's event handler and event variables. Thus, the same RAM area is used again and again by various event handlers of various applets executing on Nomad to provide efficient use of this limited resource.

Nomad Pager User-Settable Options

Figure 13:
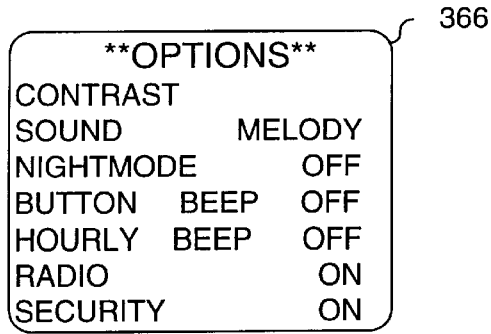
FIG. 13 is a display screen for the set Time applet included with Nomad.

Pager Options: When the user selects "Options" from the Main Menu, a list of user-settable options 366 is displayed, as shown in FIG. 13. The user navigates through the list using the Up and Down buttons. Below is the list of user-settable options available in the preferred embodiment of Nomad. The entries and their defaults are listed below in the order that they should appear. It should be noted that Paging carriers might customize the options that are available to their paging customers.

Contrast. When the user presses the Action button, the display shows:

Press Up/Down to change contrast

The up and down buttons increase and decrease the level of display contrast, respectively. The user presses the Back button to complete the operation and return to the Options list.

Sound MELODY. This setting determines the type of audio notification that is enabled. There are three states, "MELODY", "VIBRATE", and "MUTE." The pager is in the default mode when this option is set to "MELODY". In this state, notification occurs unconstrained as requested by events.

When this option is set to "VIBRATE", display notification still happens, but no audible notification occurs. For example, assume that the user is going to the theater. To avoid the Nomad's audio notification, the user sets Sound to "VIBRATE". When enabled, any event that would have triggered a beep instead triggers a default vibrate sequence. Any event that has no beep doesn't trigger a vibrate sequence.

The final option is "MUTE", this option is the opposite of "MELODY". When enabled, display notification still happens, but no audio notification occurs. Therefore, no sound or vibrate requests will occur. Only, display notification occurs, if any. Note: Any setting remains enabled until the user changes it. None of these settings time out.

Night Mode ON: Night Mode is a sequence of reminders that redefine notification settings at user-specified times. These reminders and their corresponding actions are composed by the user on a PC. This requirement means that reminders need to be able to launch applets when they mature and optionally notify the user.

A common use of Night Mode would be to determine the times Nomad should disable audio notification. For instance, during a specified period, when the user will usually be sleeping, audible notification of incoming pages will not be desired.

The default value for Night Mode is "ON". The Action button will toggle the state of this setting from "ON" to "OFF", and vice-versa. It is imperative that the user understands that by setting the Night Mode option to "OFF", only the Night Mode reminders will be disallowed. On the flipside, turning Night Mode on, allows these applet-launching reminders to occur. The manner in which Night Mode occurs, and the actions its reminders dictate are determined solely through the settings of the software that downloads data from the personal computer. A more detailed discussion of Night Mode is covered below.

Button Beep OFF: This setting determines whether a button press will be accompanied by an audible beep. The default setting is OFF. The Action button will toggle the state of this setting from ON to OFF, and vice-versa.

Hourly Beep OFF: This setting determines whether an alarm (which triggers an audio notify event) will occur every hour, on the hour. The default setting is OFF. The Action button will toggle the state of this setting from ON to OFF, and vice-versa.

Figure 14:
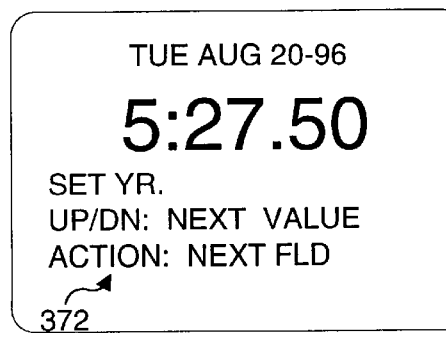
FIG. 14 is a display screen of Option presented on Nomad.

Set Time: Selecting this option will take the user to a screen 370 shown (by way of example) in FIG. 14. The current date and time are displayed on the first through third lines of text 372. The time is double height and therefore uses two rows. The next line indicates the field that will be updated when the user presses the Up and Down buttons, and this field will be blinking on the device. The user presses the Action button to cycle through the updateable fields that are "Yr.", "Mon.", "Day", "Hr.", "Min.", and "Sec." When the user finishes setting the date and time, the Back button is pressed to save the entry and return to the Main Menu.

Based on the preceding description, it will be apparent that using only four control buttons, and a display screen of limited size, Nomad is nevertheless able to provide considerable versatility in the manner in which data are displayed to the user on the screen and controlled by the user to access the data. This type of versatility in a compact user interface environment for a portable device can be employed on many other types of devices besides a combination pager and PIM data manager.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A portable device for storing and managing data accessed by a user, comprising:
   (a) a memory for storing a plurality of machine instructions and for storing the data accessed by the user;
   (b) a display on which a plurality of lines of data are presented to the user, said display being able to present only a predefined maximum number of lines, m, to the user at one time so that a list of n lines, where n can be greater than m, is presented to the user by scrolling through the list, said list having a top line and a bottom line;
   (c) a plurality of controls that selectively enable the user to control and manipulate the data presented in the lines on the display, in a manner determined as a function of a type of data being accessed by the user; and
   (d) a processor, electrically coupled to the memory, the display, and the plurality of controls, said processor implementing a plurality of functions, including:
      (i) providing a first character on the display, adjacent to a first line presented on the display, when the top line of the list has been scrolled off the display and is no longer visible; and (ii) providing a second character on the display, disposed adjacent to a last line of the display, indicating that the bottom line of the list is not currently visible on the display, when a line that is above the bottom line of the list is currently being displayed as the last line on the display.

2. The portable device of claim 1, wherein the first character comprises a first graphic icon and the second character comprises a second graphic icon.

3. The portable device of claim 1, wherein the plurality of controls includes a first pair and a second pair of controls, the controls comprising each pair performing generally inverse actions.

4. The portable device of claim 3, wherein the data that are presented to the user in the display comprise a hierarchical directory having a plurality of levels, and wherein said first and second pair of controls are context sensitive, implementing a control function that is dependent upon the type of data in a particular hierarchical level.

5. The portable device of claim 4, wherein the first pair of controls include an Action control and a Back control, said Action control causing the processor to initiate a function corresponding to a line on the display that is currently selected when the Action control is actuated.

6. The portable device of claim 5, wherein actuating the Action control causes the display to present a next lower level of the hierarchical directory, and actuating the Back control causes the display to present a next higher level of the hierarchical directory.

7. The portable device of claim 5, wherein the second pair of controls includes an Up control and a Down control, said Up control generally causing the processor to indicate that a line on the display that is above a currently selected line is selected when the Up control is actuated; and said Down control causing the processor to select a line that is below a currently selected line when the Down control is actuated.

8. The portable device of claim 4, wherein a root level of the hierarchical directory comprises an application that is automatically executed by the processor when a specified event occurs, said specified event including at least one of:
(a) energizing the portable device;
(b) resetting the portable device; and
(c) following a defined time interval in which the user has not actuated any of the controls on the portable device.

9. The portable device of claim 8, wherein the application is user selectable.

10. The portable device of claim 1, wherein the data that are presented to the user in the display comprise a menu that includes the plurality of lines.

11. The portable device of claim 10, wherein a title line of the menu is not selectable by the user and scrolls off the top of the display as the user selectively scrolls downwardly through the plurality of lines comprising the menu, to a line that was initially below a bottom line on the screen.

12. The portable device of claim 10, wherein the machine instructions cause the processor to enable the user to selectively scroll through the lines of a menu at one of a first rate and a second rate, said second rate being substantially greater than the first rate.

13. The portable device of claim 12, wherein when scrolling at the second rate, the processor causes a top line showing on the display to change by a predefined number of lines within the list, said predefined number of lines being greater than one line.

14. The portable device of claim 12, wherein the second rate is selected when the user actuates one of the plurality of controls for at least a predefined time interval.

15. The portable device of claim 1, wherein a user selectable format is applied to specific data when said data are displayed to control how the data appear on the display.

16. The portable device of claim 15, further comprising an alarm that is controlled by the processor in response to the machine instructions, said machine instructions causing the processor to display an alarm time and an announce time interval that are stored in the memory, said announce time interval indicating a time prior to the alarm time that the processor will actuate the alarm and being selectively set to a different value for different events, to provide an advance warning to the user of an event scheduled for the alarm time.

17. The portable device of claim 7, wherein the pairs of controls are used for editing data in the display, the Up control being actuated to change a selected item to a next successive logical value, the Down control being actuated to change the selected item to a previous successive logical value, the Action control being actuated to select a different item, and the Back control being actuated to implement the change selected with at least one of the Up and Down controls.

18. A portable device for storing and managing data accessed by a user, comprising:
(a) a memory for storing a plurality of machine instructions and for storing the data accessed by the user, said data comprising a hierarchical data structure;
(b) a display on which a plurality of lines of information are presented to the user, said display being able to present only a predefined maximum number of said lines, m, to the user at one time so that a list of n lines, where n may be greater than m, is presented to the user by scrolling through the list;
(c) a user interface including a plurality of controls that selectively enable the user to control and manipulate the display of said plurality of lines of information, wherein said plurality of controls are substantially fewer in number than the keys on a full alphanumeric keyboard;
(d) a processor, electrically coupled to the memory, the display, and the plurality of controls, said processor implementing a plurality of functions, including:
(i) enabling the user to actuate at least one of the plurality of controls to selectively scroll both up and down through said plurality of lines of information;
(ii) enabling the user to actuate at least one of the plurality of controls to selectively navigate up and down in said hierarchical data structure; and
(iii) enabling the user to actuate at least one of the plurality of controls to select one of said plurality of lines of information, causing said processor to launch a programmed application in response thereto; and
(e) a data communication interface capable of receiving applications from an external source, said applications not being limited to any specific functionality.

19. A portable device for storing and managing data accessed by a user, comprising:
(a) a memory for storing a plurality of machine instructions and for storing the data accessed by the user;
(b) a display on which a plurality of lines of information are presented to the user, said display being able to present only a predefined maximum number of said lines, m, to the user at one time so that a list of n lines, where n may be greater than m, is presented to the user by scrolling through the list;
(c) a plurality of controls that selectively enable the user to control and manipulate the data lines on the display in a manner that is a function of a type of information being viewed by the user; and (d) a processor, electrically coupled to the memory, the display, and the plurality of controls, said processor implementing a plurality of functions, including enabling the user to actuate at least one of the plurality of controls to selectively scroll through the plurality of lines at one of a first rate and a second rate, wherein when scrolling at the second rate, the processor causes a top line on the display to change by a predefined number of lines within the list, said predefined number of lines being greater than one line, said processor further responding to user actuation of said plurality of controls to display options to the user that are a function of the type of information being accessed by the user.

20. The portable device of claim 19, wherein the second rate is selected when the user actuates one of the plurality of controls for at least a predefined time interval.

21. The portable device of claim 20, wherein the plurality of controls include a first pair and a second pair of controls, the controls comprising each pair performing generally inverse actions.

22. The portable device of claim 21, wherein the first pair of controls include an Action control and a Back control, said Action control causing the processor to initiate a function corresponding to a line on the display that is currently selected, when the Action control is actuated.

23. The portable device of claim 22, wherein the second pair of controls includes an Up control and a Down control, said Up control generally causing the processor to indicate that a line on the display that is above a currently selected line is selected when the Up control is actuated; and said Down control causing the processor to select a line that is below a currently selected line when the Down control is actuated.

24. The portable device of claim 23, wherein actuation of the Up control for at least said predefined time interval causes the processor to scroll upwardly through the lines at the second rate, and actuation of the Down control for at least said predefined time interval causes the processor to scroll downwardly through the lines at the second rate.

25. The portable device of claim 23, wherein the pairs of controls are used for editing data in the display, the Up control being actuated to change a selected item displayed to a next successive logical value, the Down control being actuated to change the selected item to a previous successive logical value, the Action control being actuated to select a different item, and the Back control being actuated to implement the change selected with at least one of the Up and Down controls.

26. The portable device of claim 16, wherein machine instructions executing on the processor enable the user to selectively display at least one of a date and time in a plurality of user selectable formats.

27. The portable device of claim 16, wherein the user selectable format includes an alarm time.

28. A portable device for storing and managing data accessed by a user comprising:

(a) a memory for storing a plurality of machine instructions and for storing the data accessed by the user;

(b) a display on which a plurality of lines of information are presented to the user without the inclusion of a scroll bar or elevator control, said display being able to present only a predefined maximum number of said lines, m, to the user at one time so that a list of n lines, where n may be greater than m, is presented to the user by scrolling through the list, without using either a scroll bar control or an elevator control;

(c) a plurality of switches mounted on the portable device that selectively enable the user to directly control and manipulate the plurality of lines of information on the display without using a scroll bar and in a manner that is context sensitive with respect to a type of information being viewed by the user; and (d) a processor, electrically coupled to the memory, the display, and the plurality of switches, said processor implementing a plurality of functions, including enabling the user to actuate at least one of the plurality of switches to selectively scroll through the plurality of lines at one of a first rate and a second rate, said second rate being substantially greater than said first rate, said processor further responding to user actuation of said plurality of switches to display options to the user that are a function of the type of information being accessed by the user.

* * * * *